US007145972B2

(12) United States Patent
Kumar et al.

(10) Patent No.: US 7,145,972 B2
(45) Date of Patent: Dec. 5, 2006

(54) POLYPHASE CHANNELIZATION SYSTEM

(75) Inventors: Rajendra Kumar, Cerritos, CA (US); Tien M. Nguyen, Fullerton, CA (US)

(73) Assignee: The Aerospace Corporation, El Segundo, CA (US)

( * ) Notice: Subject to any disclaimer, the term of this patent is extended or adjusted under 35 U.S.C. 154(b) by 826 days.

(21) Appl. No.: 09/982,383

(22) Filed: Oct. 18, 2001

(65) Prior Publication Data
US 2003/0076899 A1    Apr. 24, 2003

(51) Int. Cl.
*H04B 1/10* (2006.01)
(52) U.S. Cl. ...................................... 375/349
(58) Field of Classification Search ................. 375/316, 375/341, 343, 349; 370/545
See application file for complete search history.

(56) References Cited
U.S. PATENT DOCUMENTS 5,909,435 A * 6/1999 Apelewicz ................. 370/342
6,081,215 A * 6/2000 Kost et al. .................. 341/120
6,356,569 B1 * 3/2002 Sonalkar et al. ............ 370/545
6,813,320 B1 * 11/2004 Claxton et al. ............. 375/316
6,823,169 B1 * 11/2004 Marko et al. .............. 455/3.02

* cited by examiner

*Primary Examiner*—Kevin Kim
(74) *Attorney, Agent, or Firm*—Derrick Michael Reid

(57) ABSTRACT

A polyphase channelizer converts an intermediate frequency wideband signal into a complex signal that is sampled by parallel analog-to-digital converters having a bank of samplers respectively clocked by staggered clocking signals for respective converters for feeding I and Q quadrature samples to a polyphase filter bank of finite impulse response filters driving a fast Fourier transform processor for providing channelized digital signal outputs. The parallel analog-to-digital converters can operate at lower speeds but are parallel connected for effectively operating at required higher speeds. The channelizer channelizes the wideband signal using a polyphase clock for enabling high speed sampling and converting through low speed parallel analog to digital converters.

9 Claims, 2 Drawing Sheets

POLYPHASE CHANNELIZER

POLYPHASE CLOCK TIMING DIAGRAM (m = 4)

POLYPHASE CHANNELIZATION SYSTEM

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of communication systems. More particularly, the present invention relates using parallel low speed analog to digital converters in combination with polyphase channelization for processing of wideband signals in communication systems.

BACKGROUND OF THE INVENTION

The present and future generations of satellites need to operate with small earth terminals as with mobile vehicle or hand held terminals. Such satellites need to be user oriented in that the user terminal needs to be relatively less complex and have small power, weight and low cost requirements. Such communications systems may be realized at the cost of increasing the complexity of the space borne equipment and central earth stations. An example of such a communication system includes an uplink that uses frequency division multiple access (FDMA) signaling with low cost and complexity terminals while the downlink uses time division multiple access (TDMA) signaling to maximize the satellite radiated power without intermodulation noise. In such communication systems, the small earth terminals do not need the capability of transmitting at very high burst rate and stringent satellite frame synchronization capabilities necessary for TDMA transmitter. The feasibility of mixed mode multiple accessing techniques require efficient means of translation between the two formats of multiple access signaling. Although analog designs can be readily realized, implementation considerations as to size, weight, cost, flexibility, and direct digital processing are expected to achieve higher performance. Digital processing can also fully exploit advances in VLSI and ASIC technologies to achieve improved performance. In wideband satellite systems, various digital signal processing methods are required by the satellite payload. Various methods of conventional digital signal processing include polyphase filtering, Fast Fourier Transform (FFT) filtering, Discrete Fourier Transform (DFT) filtering, frequency domain filtering, multistage bank filtering, and tree filter bank filtering methods. Prior digital signaling processing methods are available for translation and channelization using analytical digital signal processing methods.

In broadband satellites having nominal bandwidths in GHz regimes, major limitations are inherent in analog to digital (AD) conversion of the received broadband signal. Such A/D conversion needs to operate at least at a rate equal to two times the received signal bandwidth. This high-speed conversion rate imposes limitations on the ability of A/D converters operating at such high speeds as well as increasing power requirements and costs. In such situation, an analog filter bank may be required to first split the signal into several signals of smaller bandwidth and then digitally process each individual split signal. Such a hybrid analog and digital structure suffers from the disadvantages of the analog processing in terms of weight and power requirements of the analog filters and lacks the advantages of completely digital processing.

Present day technology involves such processing on board the satellite. An example of such a communication system uses messaging service signals communicated through satellites. In such a communication system, a forward link takes messages from an earth station to the satellite that retransmits to mobile devices through spot beams. The return link begins at the mobile devices up to the satellite and then terminates at an earth station. In such a communication system, the types of transmitter and receivers in the forward and reverse links are different. Thus, optimum uplink and downlink designs to and from the mobile devices and the earth station are different.

In one proposed communication system, the uplink uses FDMA signaling with low cost and low complexity terminals while the downlink uses TDMA signaling to maximize the satellite radiated power without intermodulation noise. In such a communication system, the small earth terminals do not need the capability of transmitting at very high burst rates nor with stringent satellite frame synchronization capabilities necessary for the TDMA transmitters. In another proposed communication system, the uplink is based on random access processing while the downlink uses TDMA. In terms of modulation, all such communication systems make use of digital techniques with inherent advantages in terms of power efficiency, flexibility, error correction and detection, coding, and encryption. The feasibility of mixed mode multiple accessing signaling methods require efficient means of signaling translation between the two formats of multiple access signaling. Such a signaling translation may involve conversion of an FDMA signal into a TDMA multiplexed signal that is then processed through a digital switch to various TDMA carriers being transmitted over the spot beams. Such signaling translations are also useful for switching FDMA carriers to different spot beams without requiring arrays of analog bandpass filters and converters. The FDMA to TDMA signaling translations involve digital channelization and switching of multiplexed channels. Digital channelization uses a digital channelizer that employs conventional digital processing methods. A digital channelizer separates and downconverts incoming multiple signals such as FDMA signals into multiple baseband signals for digital processing or for transmission over a downlink in another signaling format such as TDMA.

The analytical signal processing method is a conventional digital channelization processing method that processes multiplexed channels and utilizes analytical signal properties to reduce the channelizer complexity. The analytical signal processing method allows for relaxed filter specifications of the digital channelizer for reducing implementation complexity. In analytical signal processing systems, the high rate sampled FDMA signal S(f) with $N_c$ number of multiplexed channels, after analog down conversion of the received signal to IF range, is first filtered by an analytic complex band pass filter $\overline{H}_i(fT_u)$ where $\overline{H}_i(fT_u)$ is a frequency translated version of a prototype low pass filter $\overline{H}(fT_u)$ defined by a $\overline{H}_i(fT_u)$ equation.

$$\overline{H}_i(fT_u) = \overline{H}[(f-(i+\frac{1}{2})w)T_u]; \ i=0, 1, \ldots (N_c-1)$$

In the $\overline{H}_i(fT_u)$ equation, $T_u$ is the input signal sampling period and w denotes the bandwidth of any one of the multiplexed channels with equal bandwidth. The filter output is decimated by $N_c$ in the decimator following the filter. The output of the decimator is filtered by a complex low pass analytical filter with a frequency response $\overline{G}_i(fT_d)$ to yield the channelized signal in analytical form. The analytical filter is $\overline{G}_i(f_d')$ where $f_d'=fT_d$ and has the frequency response defined by an $\overline{G}_i(f_d')$ equation.

$$\overline{G}_i(f_d') = \begin{cases} 1; & 0 < f_d' < 0.5 \\ 0; & -0.5 < f_d' < 0 \end{cases}$$

From the Nyquist sampling theorem, the decimator output spectrum Y is related to the input X by an $Y_i(f_d')$ equation.

$$Y_i(f_d') = \frac{1}{N_c} \sum_{j=0}^{N_c-1} X_i(f_d' - j); \ f_d' = fT_d; \ T_d = N_c T_u$$

To eliminate any aliasing due to $j \neq 0$ terms in the $Y_i(f_d')$ equation, the transition band for filter $\overline{H}_i(fT_u)$ should be limited to a bandwidth w on either side of the passband because the images of the spectrum $X_i(f_d')$ are separated by $f_d'=1$ or in terms of frequency f by 2w Hz and thus the transition band effects only the spectrum intervening the images of the desired spectrum, which is filtered by $\overline{G}_i(f_d')$.

Thus, the channel signal can be recovered with no aliasing error even though filter $\overline{H}_i(fT_u)$ has a transition band of w Hz on either side. The transition band however, makes the design of the filter easier. The output $\overline{U}(fT_d)$ is in analytic form. To obtain the corresponding real valued signal, one obtains the complex-conjugate part of the spectrum $\overline{U}(fT_d)$. Representing analytic functions $\overline{H}_i$ and $\overline{G}_i$ as a sum of the respective conjugate symmetric parts $H_i$ and $G_i$ and anti symmetric parts $H_i'$ $G_i'$, the equivalent implementation of the analytic signal approach can be derived. In this equivalent implementation, the signal $S(fT_u)$ is first filtered by two filter branches. The first branch consists of a cascade of $H_i(fT_u)$, a decimator by $N_c$ and filter $G_i(fT_u)$. The second branch consists of a cascade of $H_i'(fT_u)$, decimator by $N_c$, and filter $G_i'(fT_u)$. The outputs of the two branches is summed and multiplied by $(-1)^{in}$ to yield the desired channelized signal. The operation of multiplying by $(-1)^{in}$ where n denotes discrete time index and i is the channel number in time domain corresponds to frequency shift of w and is required for odd channels. For even channels (i even) $(-1)^{in} \equiv 1$ and no additional operation is involved.

In terms of computational complexity, the number of multiplications $M_{AS}$ required per input channel per second is given by the following $M_{AS}$ and K equations.

$$M_{AS} = \kappa w^2 \frac{w(N_C + 4) - 2B(N_C + 2)}{(w - B)(w - 2B)}$$

$$\kappa = -\frac{2}{3} \log[5\delta_1 \delta_2]$$

In the K equation, $\delta_1$ and $\delta_2$ denote the specified in-band and out-of-band ripple respectively, and B denotes the filtering bandwidth of the channelizer. The filtering bandwidth in general is smaller than w to allow for guard bands.

In a direct implementation of the polyphase digital Fourier transform (PDFT) approach for an analyzer synthesizer model, the input signal x(n) is demodulated by the exponential function $e^{-j\omega_k n}$, low pass filtered by the filter h(n) providing a resulting signal that is down sampled by a factor M. The synthesizer model interpolates all the channel signals back to the high sampling rate, filters the signal by filter f(n) to remove the imaging components, and modulates the resulting signal by complex exponential function $e^{j\omega_k n}$ to translate the resulting signal back to frequency $\omega_k$. The output of the synthesizer is the sum of the K channel output signals.

$$\hat{x}(n) = \sum_{k=0}^{K-1} \hat{x}_k(n)$$

The polyphase realization of the DFT filter bank is based on the polyphase implementation of the decimators and interpolators. Such a realization is relatively simple for the case of critically sampled filter banks wherein M=K. In this case the number of independent channels $N_c$ is also equal to K. Designs for other choices of M and K are relatively more complex. In the case of M=K, the center frequencies of the K frequency bands are given by an $\omega_k$ equation.

$$\omega_k = \frac{2\pi k}{K}; \ k = 0, 1, \ldots, K-1; \ K = M$$

The analyzer synthesizer model can be shown to be equivalent to the integer band model where, in the analyzer, the input signal x(n) is filtered by a bandpass filter of impulse response $h_k(n)$, the output of which is decimated by M to provide $x_k(m)$. In the synthesizer, the input channel signal $\hat{x}_k(m)$ is first interpolated by M and the resulting signal is bandpass filtered with filter of impulse response $f_k(n)$ to provide $x_k(m)$. Sum of all the $x_k(m)$, $k=1,2,\ldots,K$ then provides the synthesizer output.

The filter impulse response functions $h_k(n)$ are given by $h_k(n)$ equations.

$$h_k(n) = h(n) W_K^{kn}; \ W_K = e^{j2\pi/K} = W_M; \ f_k(n) = f(n) W_K^{kn}$$

An $X_k(m)$ equation follows from the $h_k(n)$ equations.

$$X_k(m) = \sum_{n=-\infty}^{\infty} h(n) W_M^{kn} x(mM - n)$$

With change of variables $n = rM - i$, the $x_k(m)$ equation can be rewritten as alternative $X_k(m)$ equations.

$$X_k(m) = \sum_{i=0}^{M-1} \sum_{r=-\infty}^{r=\infty} \overline{p}_i(r) W_M^{-ki} x_i(m-r) = \sum_{i=0}^{M-1} W_M^{-ki} [\overline{p}_i(m) \otimes x_i(m)]$$

In the $X_k(m)$ equation, $\otimes$ denotes convolution, and $\overline{p}_i(m)$ is the impulse response of the $i^{th}$ polyphase branch given in terms of h(n) as $\overline{p}_i(m) = h(mM - i)$ for $i=0, 1$, through M−1, and branch input signals $x_i(m)$ are given as $x_i(m) = x(mM + i)$.

The alternative $X_k(m)$ equations lead to the polyphase DFT filter bank structure. This structure comprises a commutator that demultiplexes the input signal into K=M signals $x_i(m)$, each of which is filtered by its corresponding polyphase filter $\overline{p}_i(m)$. The outputs of the K filters are processed by a K point FFT processor whose outputs comprise the samples of the K channel signals.

Similarly the polyphase DFT filter bank synthesis structure is derived whose polyphase filters have impulse response given by a $q_i(m)$ equation.

$$q_i(m) = f(mM + i); \ i = 0, 1, \ldots, M-1$$

The polyphase implementation has the advantage of reducing the computational requirements by order K compared to direct form. In terms of polyphase branch filter design there are two broad categories of design, including finite impulse response (FIR) and infinite impulse response (IIR) filters. The FIR filters can be designed on the basis of windows using Hamming, Hanning, or Kaiser techniques, optimal equiripple linear phase design based on Chebyshev approximation and a multi-exchange Remez algorithm, half band filters that further reduce the computational requirements, and filter designs based on direct optimization of a criterion function. The IIR filter can be designed as in the classical approach or may be based on a transformation wherein the denominator is a polynomial in $Z^M$ and thereby exploits the interpolator and decimator structure to minimize the computational requirements.

The polyphase implementation effectively allows sharing one lowpass filter among all the channels with the help of FFT transform. The total number of real multiplications required per second per channel is found by an $M_{PDFT}$ equation.

$$M_{PDFT} = 2w \left[ \frac{\left[\frac{2}{3}\log[1/(10\delta_1\delta_2)]\right]}{(w-2B)} + 4\log_2(N_C) \right]$$

The frequency domain filtering (FDF) method is based on the use of FFT techniques in the filtering operation. In time domain, the filtering operation consists of discrete convolution of the sampled input signal with the filter impulse response. Equivalently the result can be obtained by multiplying the Fourier transform of the input signal with filter frequency response and taking the inverse transform of the result. This is the basis of FDF techniques. Even though this approach may seem to be more indirect compared to direct convolution used in FIR filter implementation, this can be made computationally more efficient by using FFT technique in computing the fast Fourier transform (FFT) and inverse fast Fourier transform (IFFT). However, the application of FFT results in a circular convolution of the input signal segment and the filter impulse response instead of the desired linear convolution. This problem is overcome by an appropriate modification of the straightforward FFT approach. Two such modification techniques, the overlap-save sectioning and the overlap-add sectioning, are well known. Modification techniques use Q to denote the filter impulse response length and N be the sequence length selected for the FFT operation, where N is greater than Q. The term N can of course be selected in an optimal manner so as to minimize the overall computational complexity.

In the overlap-save section method, the incoming signal is segmented into sections of length N such that the adjacent sections have an overlap of (Q−1) samples. Each such section is circularly convolved with the filter response also of length N after padding with zeros, using FFT approach. The first (Q−1) samples of the result are discarded for each section and the truncated sections are concatenated to yield the desired linear convolution. In the overlap-add sectioning method, the input signal is segmented into disjoint sections of length N−Q. Each section is augmented by a sequence of zeros of length Q to yield a sequence of length N, which is circularly convolved with the augmented filter impulse response using FFT techniques. The resulting sequences are aligned in such a manner that there is an overlap of length Q between the successive sequences. During the period of no overlap, individual sequences then provide the desired response. During the periods of overlap, the two overlapping sequences are added to yield the desired output. Both the overlap-save sectioning and overlap-add sectioning methods provide the desired linear convolution.

A specific channelization scheme is known as an FDF channelization scheme that uses an overlap-save approach. An example of a specific channelization scheme uses a 50% overlap, that is, N=2Q. The FDF channelization scheme considers an FDMA signal of 6.0 MHz bandwidth consisting of 300 channels of 20.0 KHz bandwidth each. Simulations in the frequency domain indicate that each channel must have at least sixteen samples points corresponding to a resolution of 1.25 KHz. Thus, for the complete band, at least 4800 points are required. Rounding up to the nearest power of two, an FFT size of 8192 was selected. In terms of $N_C$, the length for FFT operation is $N \cong 16N_C$. The number of multiplications for an FFT or IFFT of size is given by $N\log_2 N$. For the implementation requiring only one IFFT, the number of multiplications is equal to $2N[\log_2 N+4]$. For real time operation, the operations must be performed in $(NT_s/2)$ sec, where $T_s$ is the sampling period of the FDMA signal and the factor 2 accounts for 50% overlap. Therefore the number of multiplications per second is given by an $M_{DFF}$ equation.

$$M_{DFF} = 4f_s \log_2[16N_c + 4]$$

In the MDFF equation, $f_s=1/T_s$ is the sampling rate selected equal to 10.24 MHz. In practice the number of IFFTs will be determined by the number of outputs of the digital transplexer that may be connected to different spot beams in the satellite communication applications. For example, when there are twelve beams analyzed, the number of operations given by the $M_{DFF}$ equation is roughly multiplied by the number of the outputs.

The multistage (MS) approach provides a means of channelization using successive stages of half-bank filters. Therefore, this technique is appropriate only when $N_C=2^L$ where L denotes the number of stages of filtering and decimating. This method provides moderate flexibility and computational efficiency, but the efficiency decreases as the number of channels decreases. The total number of real multiplications required per second per channel is found to be in an $M_{MS}$ equation.

$$M_{MS} = \left[\left(\frac{N_F+1}{2}+1\right)\left(\log_2 N_C - \frac{1}{2}\right) + N_G\right] 2w$$

In the $M_{MS}$ equation, $N_F$ denotes the number of coefficients of the half band filters, $N_G$ is the number of coefficients of the last filter of the tree, and w and $N_C$ are defined previously.

The communication of broadband signals require A/D converters operating at a very high rate imposing limitations in terms of availability and power requirements. The A/D conversion is a major limitation in extending DSP applications to higher and higher bandwidth signals. A flash type of A/D conversion may be required for conventional implementation. In a given state of A/D conversion technology, there are severe restrictions in terms of availability, the cost and power requirements versus the required sampling rate, and A/D conversion accuracy measured in terms of the number of bits per sample. Thus for a wide band signal, in conventional implementation, the A/D converter may not be available, may not have the required number of bits, or may require excessive power, or may be exceedingly expensive.

In wideband systems, the channelization may be performed in a number of hierarchical stages and in principle different stages may apply different channelization techniques including both digital and analog as hybrid techniques to obtain the most flexible and optimum overall architecture. For example, when the total band is 500.0 MHz, the band may be divided first into six channels each with an 80.0 MHz bandwidth. This stage may be implemented using surface wave acoustic SAW filters or one of the digital techniques. The second stage channelizer may divide the 80.0 MHz band in to four bands of 20.0 MHz band each. This stage may be implemented by the polyphase FFT approach or the analytical approach. The third stage is used to separate signals with bandwidth ranging from 64.0 KHz to 10.0 MHz. A frequency domain filtering approach using pipeline FFT architecture or a multistage tree approach may be used for this stage. There are many possible variations for such a multistage hybrid channelizer.

Digital TV receivers with polyphase analog-to-digital conversion of baseband symbol coding is taught by Limberg in U.S. Pat. No. 5,852,477. Limberg teaches the use of multiple, that is parallel, analog-to-digital converters (ADC) for filtering a single baseband channel in the digital TV receiver. The signal comprises several time-interleaved data streams. In the present disclosure, use of parallel ADCs is taught for the purpose of separating many (N) channels with different carrier frequencies in a FDM format. In most direct digital implementation, the composite signal is first sampled at a high rate of at least two times the bandwidth of composite signals followed by a bank of bandpass filters centered around the incoming channel carrier frequencies. This procedure is referred to as channelization. Limberg does not teach a channelizer procedure. The signal at the input to the bank of ADCs is a real baseband signal. In the channelizer application, the signal is either a complex baseband signal or a complex IF signal obtained by a complex mixer, the latter is preferably used in this application instead of an alternative Hilbert transform approach for implementation simplicity for achieving a complex IF analytic signal. An analytic signal is one where the spectrum of the analytic signal is zero for negative frequencies. Limberg does not teach such frequency separation and downconversion. Limberg teaches the use of multiple filters for filtering of several (M) time multiplexed data streams in the same channel. However, the polyphase filters each have same number of filter coefficients as in a length of the original filter. Thus the amount of hardware is M times the hardware required for a direct implementation of a single filter. Moreover, the outputs of the filters are not combined as a polyphase channelizer. Hence, there is no FFT processor as is required for combining the polyphase filters outputs. Limberg does not teach polyphase channelization. These and other disadvantages are solved or reduced using the invention.

SUMMARY OF THE INVENTION

An object of the invention is to provide to process wideband communication signals using low speed analog digital converters.

Another object of the invention is to provide a polyphase channelization communication system using low speed analog digital converters connected in parallel to effectively provide high speed processing of wideband signals.

The present invention is directed to a communication system for wideband signal processing through parallel analog to digital converters (ADCs) in combination with polyphase channelization. The ADCs can be low speed ADCs operating in parallel to provide effective high speed analog to digital (A/D) conversion. The polyphase channelization enables the use of the low speed ADCs. The polyphase channelization is perfected by a polyphase channelizer includes a complex mixer for downconversion of the input wideband signal into baseband quadrature signals that are fed into the parallel A/D converters having a plurality of converter channelized outputs. The converter channelized outputs are fed into a bank of polyphase filters and a fast Fourier transform (FFT) processor that provides a plurality of channelized digital outputs. The wideband input signal is downconverted into a quadrature signal and converted into digital form for processing by the filter bank and FFT processor. The FFT processor combines polyphase filter outputs so as to produce digital output signals for the communication input channels at different carrier frequencies separated and downconverted to baseband. The digital output signals have a zero center frequency. When the wideband composite signal input is over a complex baseband or IF, individual channels have different center frequencies. Thus, the polyphase channelizer performs both functions of the frequency downconversion and separation. In the polyphase filtering, the task of filtering is divided into smaller tasks performed by individual filters. Thus, the filter length and hence computational task performed by individual polyphase filters is only 1/N of the filter length in direct implementation of a single bandpass filter. In addition, the same polyphase filters are shared by all the channels to reduce the computational task by approximately by a factor of N. The polyphase channelizer offers channelized baseband digital processing of wideband signals using low speed ADCs for reduced power consumption.

The invention is preferably applicable to satellite communication systems using digital signal processing of broadband or wideband signals. The satellite communication systems may have an uplink microwave signal that may be, for example, in the X band or Ka Band of the radio frequency spectrum that is received by the satellite antenna. Such an antenna may be, for example, of a reflector type or a phased-array antenna. Further the antenna may be a global coverage or a spot beam antenna. The parallel architecture using polyphase channelizer in combination with several parallel A/D converters operates at an order of magnitude lower in speeds to effectively provide a high-speed A/D conversion. These and other advantages will become more apparent from the following detailed description of the preferred embodiment.

DETAILED DESCRIPTION OF THE PREFERRED EMBODIMENT

Figure 1:
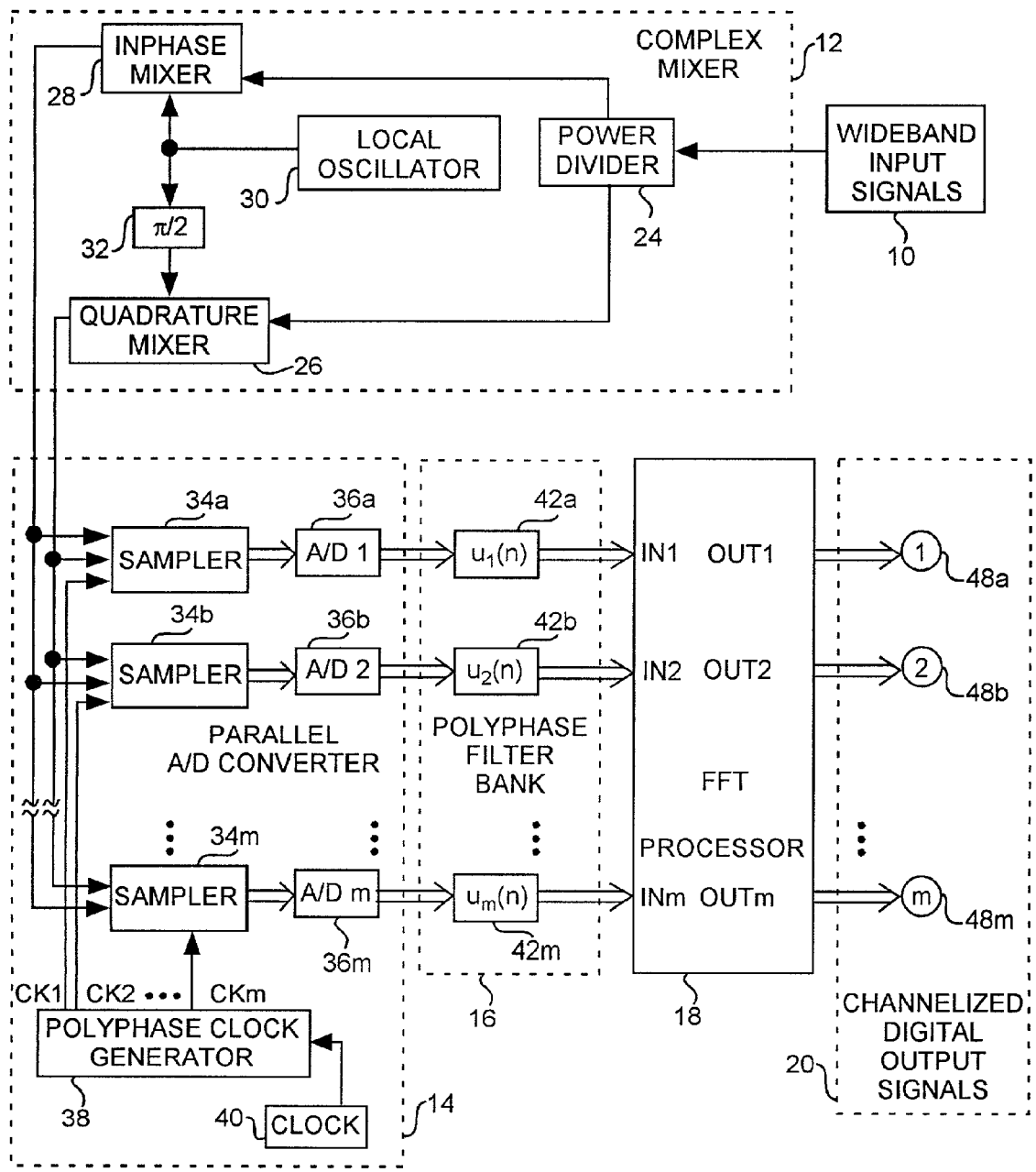
FIG. 1 is a block diagram of polyphase channelizer.

An embodiment of the invention is described with reference to the figures using reference designations as shown in the figures. Referring to FIG. 1, a communication antenna, not shown, receives a wideband or broadband signal 10 that is processed through a complex mixer 12, a parallel analog-to-digital (A/D) converter 14, a polyphase filter bank 16, and a fast Fourier transform processor 18, for providing channelized digital signal outputs 20. The wideband signal may be received through a low noise amplifier, not shown, that amplifies the received wideband signal to an appropriate power level. The received wideband signal is typically communicated to a receiver, not shown, providing a wideband signal input 10. The receiver may include conventional RF bandpass filters and RF amplifier, not shown, for further amplification, as is well know. The receiver may further downconvert the received radio frequency (RF) wideband signal into the wideband signal input 10 at an intermediate frequency (IF).

The wideband signal input 10 is communicated to a complex mixer 12 that functions as a complex downconverter. The complex mixer 12 includes a power divider 24, a local oscillator 30, an inphase mixer 28, a quadrature mixer 26 and a π/2 phase shifter 32. The wideband signal input 10 is communicated to the power divider 24 that splits the wideband signal input 10 into a first divider output signal and a second divider output signals respectively fed to the mixers 28 and 26. Each of the first and second divider output signals has a power level that is half of the power level of the wideband signal input 10. The first divider output of the power divider 24 is an input to the quadrature mixer 26, and the second divider output of the power divider 24 is an input to the inphase mixer 28. The local oscillator 30 provides a local oscillator signal that is communicated to the inphase mixer 28 for downconverting the first divider output signal into an IF or baseband inphase signal. The local oscillator signal from the local oscillator 30 is also communicated to the phase shifter 32 for quadrature phase shifting of the local oscillator 30 for downconversion of the second divider output signal by quadrature mixer 26 providing an IF or baseband quadrature signal. The quadrature mixer 28 receives local oscillator signal through the π/2 phase shifter 32 for quadrature downconversion. The π/2 phase shifter 32 generates the quadrature phase local oscillator demodulation signal by introducing a 90 degree, that is π/2 radians, phase shift in the local oscillator demodulation signal.

The inphase signal and the quadrature signal respectively from the mixers 28 and 26 have a center frequency $f_{IF}$ that is smaller than the center frequency $F_{WB}$ of the wideband signal input 10. The local oscillator 30 provides the local oscillator signal having a frequency $f_{LO}$ that is the difference between center frequency $f_{WB}$ and $f_{IF}$. In a specific case where $f_{WB}$ and $f_{IF}$ are equal, the inphase and quadrature outputs respectively from the mixers 28 and 26 will be at baseband, and not at an IF. The inphase signal from the output of mixer 28 and the quadrature signal at the output of mixer 26 respectively form the real and imaginary parts of a complex signal as an analytic signal. Hence, the outputs of mixers 28 and 26 together provide an analytic complex signal. An analytic complex signal is a signal having a spectrum that is zero for negative frequencies. Alternatively, the analytical signal may also be obtained using Hilbert transforms where the quadrature signal is obtained at the output of a Hilbert transform filter filtering the inphase signal output of mixer 28.

The inphase and quadrature signals at the output of complex mixer 12 are fed into samplers 34a, 34b, through 34m of the parallel A/D Converters 14. The number of samplers 34 is equal to the number of communication channels in the wideband signal input 10. Most often, the number of samplers 34a through 34m is equal to the number of input signals superimposed within the wideband signal input 10. However, more generally, the number of samplers 34a through 34m may be an integer submultiple of the number of communication channels. Such may be the case, for example, when the channelization is performed in more than one stage. The signal channelization can be equivalently performed in more than one stage, though shown for convenience to be in one stage, in a tree channelization configuration wherein the channelized digital signal outputs 48a, 48b, through 48m are in turn input to baseband channelizers, not shown. Each of such baseband channelizer would replicate filter banks 16 and FFT processors 18. For convenience, the number of samplers 34a through 34m is taken to be equal to the number of input channels N in the wideband signal 10. In the preferred form, only a single stage polyphase channelizer is used having one filter band 16 and one of the FFT processors 18.

Each of the samplers 34a through 34m simultaneously samples two input signals that are respectively the inphase signal and the quadrature signal from the complex mixer 12. For the first sampler 34a, the sampling instances are provided by the signal CK1 at the output of polyphase clock generator 14. The frequency of clock CK1 is equal to the required sampling frequency for the wideband signal input 10 divided by 2N. The required sampling frequency for the wideband signals is dictated by the Nyquist criteria and must be at least two times the bandwidth of the wideband signal. In practice, the sampling rate may be two to three times the signal bandwidth. The process of sampling results in producing replicas of the analytic signal at input of the samplers 34a, 34b, through 34m. The replica signals are separated from the analytic signal by multiples of the sampling frequency $f_s$. The sampling frequency $f_s$ is selected so that one of the replica signals is centered about the zero frequency. The center frequency of any one replica signal of a channel is at zero frequency with $f_s$ at least two times the wideband input signal bandwidth. The rate of clock CK1 is equal to $f_s$ divided by N. The first sampled signal output at the sampler 34a output is digitized by the analog-to-digital converter 36a which produces at its output the first digital signal. The analytic signal is sampled in the sampler 34b by sampling clock CK2 generated by the polyphase clock generator 38 to generate a second sampled signal at the sampler 34b output. The second sampled signal is input to an analog-to-digital converter 36b, which creates the second digital signal at its output. In this manner, the cascade of sampler 34c and analog-to-digital converter 36c with clock signal CK3 from the polyphase clock generator generates a third digital signal, and so on in a likewise manner with the Nth digital signal generated at the output of converter 36m by the cascade of sampler 34m and analog-to-digital converter 36m with clock input CKm generated by the polyphase clock generator 38. For simplicity of description, the sampler and A/D converter is shown as separate units, however, depending upon specific integrated circuit chips used for implementation, the two functions may be performed by a single chip. Similarly specific details in terms of serial or parallel nature of bits at the A/D converter output will depend on the specific chips used. The outputs of the A/D converters may be bit serial. Otherwise a parallel-to-serial converter is added at the outputs of each of the A/D converters 36a, 36b, through 36m. The outputs of the parallel-to-serial converters are then input to polyphase filters 42a, 42b, through 42m respectively.

The digital outputs of the analog to digital converters 36a, 36b, through and 36m are input to the polyphase filters 42a, 42b, through and 42m respectively. The design methodology of the polyphase filters is well known in the art. In the design methodology, first a prototype filter is designed to operate at a sampling rate of $f_s$ with a bandwidth equal to one half of the bandwidth of one of the channels in the input wideband signal 10. The exact filter characteristics in terms of the pass band, transition band and stop band characteristics are dependent upon the actual channelizer application and are part of user defined specifications. Using conventional digital filter approaches, a digital design of a low pass filter is obtained. Such a filter may be either a finite impulse response (FIR) or an infinite impulse response (IIR) filter. Both FIR and IIR filters have some relative advantages and disadvantages. However, an FIR filter is usually preferred due to inherent linear phase characteristics without filter instability. The FIR filter design is characterized by an inherent impulse response sequence $\{h_k\}$. The length M of this sequence and the actual values of the coefficients $h_k$ are based on the filter specifications and the specific FIR filter design used. Following the FIR approach in the preferred form, the polyphase filters 42a, 42b, . . . , and 42m are also FIR with impulse response sequences being equal to the appropriate subsequences of $\{h_k\}$. More specifically, when M is an integer multiple of N, that is, when M=KN where K is some integer, then each of the polyphase filters have a length K. More specifically, the impulse response sequence of the polyphase filter 42a, denoted $\{u_1(0), u_1(1),$ through $u_1(K-1)\}$, is given by $\{h_0, h_N, h_{2N},$ through and $h_{(K-1)N}\}$. The coefficients of the polyphase filter 42b denoted $\{u_2(0), u_2(1),$ through and $u_2(K-1)\}$ is given by $\{h_{N-1}, h_{2N-1}, h_{3N-1},$ through and $h_{(KN-1)}\}$. In a likewise manner, the coefficients of all of the polyphase filters 42c, 42d, through 42m are obtained from the FIR filter response $\{h_k\}$ for staggered filtering with the response of filter 42m denoted by $\{u_{N-1}(0), u_{N-1}(1),$ through and $u_{N-1}(K-1)\}$ and is given by $\{h_1, h_{N+1}, h_{2N+1},$ through $h_{((K-1)N+1)}\}$. When the number of coefficients M in the FIR filter response $\{h_k\}$ is not exactly equal to an integer multiple of N, a required number of zeros are appended to the response to make M equal to the nearest integer multiple of K to obtain the impulse response of the polyphase filters.

The polyphase bank filtered outputs at the outputs of the polyphase filters 42a, 42b, through and 42m are inputs to a FFT processor 18 that computes the N point Fast Fourier transform of the N inputs once every $(f_s/N)^{-1}$ second, that is, at the rate $f_s/N$ that is the sampling rate required for individual channels present in the wideband input signal 10 and produces N outputs 48a, 48b, through 48m every $T_L=T_H/N$ second, where $T_H=1/f_s$ is the sampling period corresponding to the fast sampling rate $f_s$ and $T_L$ is the period for the slow sampling rate $f_s/N$ corresponding to the sampling rate required for the individual channels. The outputs 48a, 48b, through 48m constitute the sampled and digitized versions of the N channels present in the wideband input signal 10. The channelizer thus effectively bandpass filters the N channel signals with different and adjacent center frequencies within the wideband input signal 10 band, downconverts them to the complex baseband form and converts them into digital form. This is achieved in the invention, without operating any digital unit including the analog-to-digital conversion at the fast sampling rate and with the filtering hardware requirements essentially equal to those required for filtering a single channel. The channelizer outputs 48a, 48b, through 48m can then be inputted to various units for processing depending upon the channelizer applications. For example, the channelizer outputs 48a through 48m, may be switched to the inputs of upconverters corresponding to different downlink beams on board the satellite or may be input to digital data detectors in regenerative type satellites.

Figure 2:
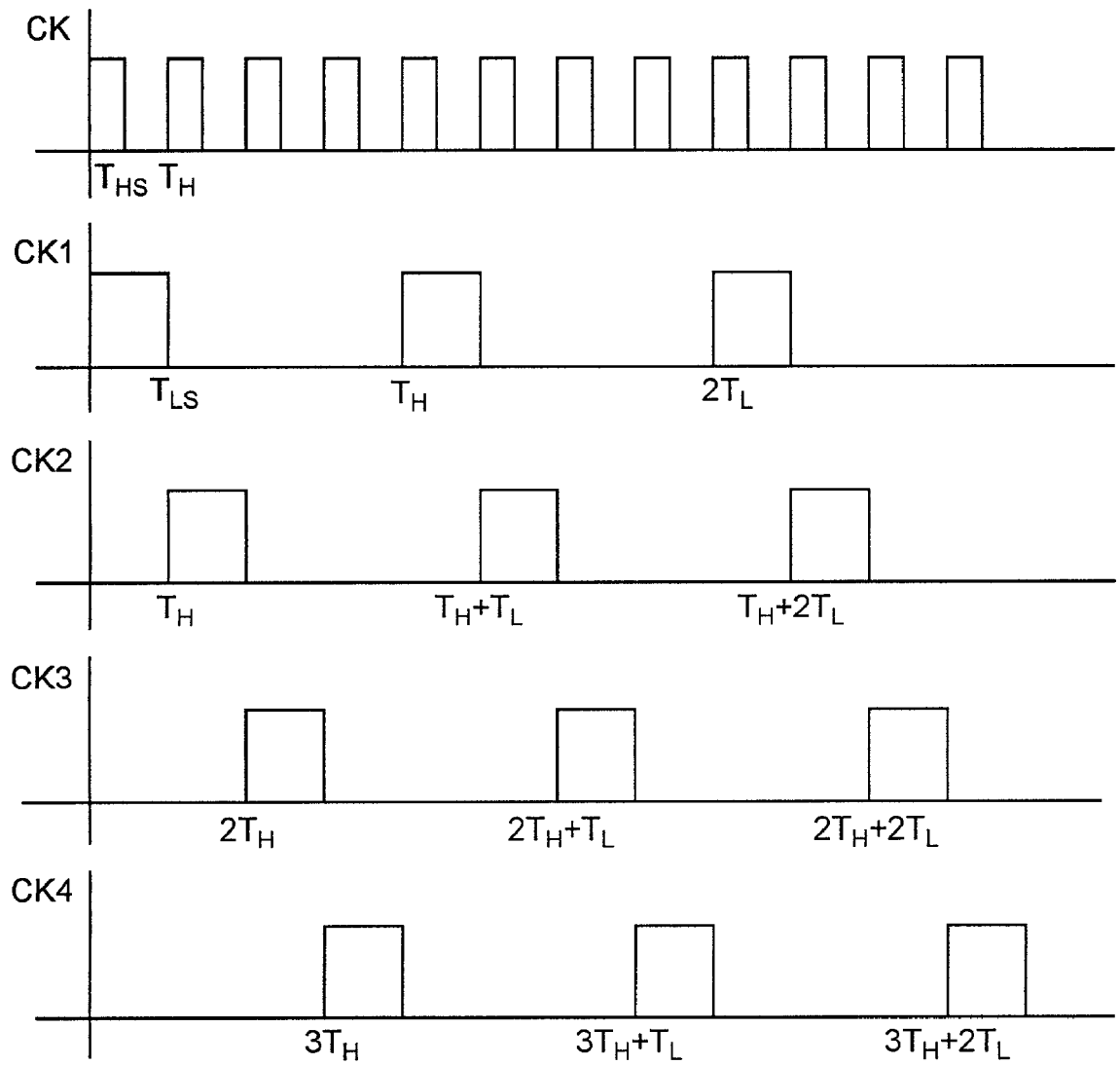
FIG. 2 is a polyphase clock timing diagram.

Referring to FIGS. 1 and 2, a timing diagram for the polyphase clocks is generated by the polyphase clock generator 38 for the case of N=4. The polyphase generator is driven by the clock signal CK with its period $T_H$ equal to $1/f_s$. The term $T_{HS}$ denotes the duration available for the purpose of sampling with $T_H-T_{HS}$ available for A/D conversion if a conventional approach were used. In the preferred form, the clock CK is not used directly in the channelizer, rather the clock CK generates phase-staggered clocks Ck1, CK2, through CKN each of a frequency $f_s/N$. Thus, the period available for sampling and A/D conversion process is increased to $T_L=NT_H$ where $T_L>>T_H$ and where N>>1. Thus, each of the A/D converters can be relatively slow and inexpensive. The channelizer including the A/D converters may be built on a single chip.

The parallel architecture of the high speed A/D converter is adapted to receive in complex form the input broadband signal using a set of N parallel sampling circuits whose sampling instances are provided by polyphase clocks $CK_1$, $CK_2$, . . . , $CK_N$. The polyphase clock signals may be generated for the case where N=4 as shown in FIG. 2. The period $T_H$ denotes the high rate sampling clock and $T_{HS}$ denotes the sampling time required by the sampler. The sampler and A/D converter may be on a single chip. In this case, the ratio $T_{HS}/T_H$ denotes the duty cycle of the clock. In the high rate A/D conversion, the available analog to digital conversion time is $T_H-T_{HS}$. Usually, $T_{HS}$ is much less than $T_H$. The sampling operation involves switching of an analog gate and charging a capacitor through this gate after which the capacitor holds the sample value during the A/D conversion process that involves sequential processing. In the parallel architecture, the available time for sampling is $T_{LS}=T_H$ with $T_{L-TH}$ time available for A/D conversion where $T_L=NT_H$ is the total time available for sampling and A/D conversion. The sampling is a fast process and can be performed in period $T_H$ when $T_H>>T_{HS}$. However, the A/D conversion time is now extended to $T_L-T_H=(N-1)T_H$. Thus, by increasing the value of N, this $T_H$ period can be enlarged to a desired value. The buffers at the A/D converter outputs hold the binary word representing the sampled value for the $T_L$ duration. At the end of the $T_L$ interval, the digital multiplexer reads out the buffers sequentially to the converter outputs with the $i^{th}$ buffer selected during the interval determined by the corresponding clock $CK_i$, where i=1, 2, through N. As the digital multiplexer merely uses digital gating operations, the digital multiplexer can operate at high speeds without limiting the speed of operation of the overall circuit. In many applications, the digital signal may be split into M streams using a digital demultiplexer. In such cases, both multiplexer and demultiplexer are eliminated when N is selected to equal M and considerably simplified when N is selected not equal to M using the digital channelizer. The polyphase channelizer can be integrated with a parallel A/D converter architecture. The wideband RF signals are received by the channelizer after being downconverted to an intermediate frequency $f_{IF}$. The intermediate frequency $f_{IF}$ signals are an input to the integrated polyphase FFT channelizer. The signal is an input to the complex mixer having an output that is an analytic complex valued bandpass signal at the selected IF frequency $f_{IF}$ and bandwidth $B_{IF}$. This analytic signal is sampled at a rate $f_s=1/T_s$ higher than $2B_{IF}$. The rate $f_s$ may be an integer submultiple of $f_{IF}$. The sampled analytic signal is then A/D converted to yield the desired complex valued baseband signal in digital form. Such a baseband signal is then demultiplexed into M channels that are individually filtered by digital polyphase filters with impulse responses $u_1(m), u_2(m),$ through $u_M(m)$ respectively. Integrating the sampling and filtering with the parallel A/D conversion enables parallel low speed A/D conversion. Hence, the IF signal is the input to M low speed A/D converters having converter outputs that are inputs to the respective polyphase digital filters also operating at a low rate. The polyphase filter outputs are then processed by the FFT processor. The FFT processor computes FFT transforms. The FFT processor outputs are the desired complex baseband signals having real and imaginary parts that are the real and imaginary parts of the desired baseband channel signals. Hence, the polyphase channelizer architecture uses low rate A/D conversion for processing high rate digital signals.

The invention enables a parallel architecture of low speed A/D converters to create a high speed A/D converter. For example, ten A/D converters operating at 200.0 MHz each can be combined to provide an effective 2.0 GHz converter for increasing the frequency range over which A/D conversion can be performed by orders of magnitude. The architecture can be modular and incorporated in a chip set or a single chip with polyphase and FFT architecture providing an efficient translator and channelizer for wideband signals. Those skilled in the art can make enhancements, improvements, and modifications to the invention, and these enhancements, improvements, and modifications may nonetheless fall within the spirit and scope of the following claims.

What is claimed is:

1. A system for channelizing an IF wideband input signal into separated channelized digital output signals, the system comprising,
    a complex mixer for quadrature demodulation of the IF wideband input signal into a complex signal,
    a polyphase clock generator for generating polyphase clock signals each having the same clocking signal that is staggered in phase over a clock cycle,
    a parallel converter comprising a bank of samplers for respective sampling the complex signal into staggered sampled complex signals and comprising a bank of converters for converting the staggered sampled complex signals into respective sampled digital complex signals, each of the samplers of the bank of sampler sampling the complex signals at a rate of the clock cycle at a respective staggered phase, and
    a parallel filter bank comprising a polyphase filter bank of filters for respective filtering the sampled digital complex signals into respective filtered complex signals and comprising a processor for transforming the filtered complex signals into the channelized digital output signals, the channelized digital output signals being separated from each other and corresponding to a respective plurality of frequency band signals of the IF wideband signal.

2. A system for channelizing an IF wideband input signal into separated channelized digital output signals, the system comprising,
    a complex mixer for quadrature demodulation of the IF wideband input signal into a complex signal,
    a polyphase clock generator for generating polyphase clock signals each having the same clocking signal that is staggered in phase over a clock cycle,
    a parallel converter comprising a bank of samplers for respective sampling the complex signal into staggered sampled complex signals and comprising a bank of converters for converting the staggered sampled complex signals into respective sampled digital complex signals, each of the samplers of the bank of sampler sampling the complex signals at a rate of the clock cycle at a respective staggered phase, and
    a parallel filter bank comprising a polyphase filter bank of filters for respective filtering the sampled digital complex signals into respective filtered complex signals and comprising a processor for transforming the filtered complex signals into the channelized digital output signals, wherein,
    the processor is a Fast Fourier Transform processor for computing N point Fast Fourier transforms of the N filter complex signals once every clock cycle of $(f_s/N)^{-1}$ seconds.

3. The system of claim 2 wherein,
    the polyphase filter bank comprises a plurality of digital filters each of which is a finite impulse response filter.

4. The system of claim 2 wherein,
    the polyphase filter bank comprises a plurality of digital filters each of which is an infinite impulse response filter.

5. The system of claim 2 wherein,
    the input signal comprises a plurality of channel signals that are frequency division multiple access signals having a channel bandwidth, and
    the polyphase filter bank comprises a plurality of digital filters each of which having a bandwidth equal to ½ of a bandwidth of a respective channel signal in the input signal.

6. The system of claim 2 wherein,
    the input signal is an IF wideband signal communicating channel signals communicated within a channel bandwidth,
    the complex signal comprises I and Q quadrature baseband signals,
    the staggered sampled complex signals are staggered sampled I and Q quadrature baseband signals, the sampled digital complex signals are digitized staggered sampled I and Q quadrature baseband signals,
    the filtered complex signals are baseband channel signals within ½ of the channel bandwidth, and
    the channelized digital output signals are separated baseband channel signals.

7. A system for channelizing an IF wideband signal into channelized digital output signals, the system comprising,
    a complex mixer for quadrature demodulation of the IF wideband signal into a complex signal communicating channel signals communicated within a channel bandwidth, the complex signal comprises I and Q quadrature baseband signals,
    a polyphase clock generator for generating polyphase clock signals each of which having the same clocking signal that is staggered in phase over a clock cycle,
    a bank of samplers for respective sampling the I and Q baseband quadrature signals into staggered sampled I and Q quadrature signals, each of the samplers of the bank of sampler sampling the I and Q quadrature signals at a rate of the clock cycle at a respective staggered phase,
    a bank of converters for converting the staggered sampled I and Q quadrature signals into respective sampled digital I and Q quadrature signals,
    a polyphase filter bank of filters for respective filtering the sampled digital I and Q quadrature signals into respective filtered I and Q quadrature signals, and
    a processor for transforming the filtered I and Q quadrature signals into the channelized digital output signals, the channelized digital output signals being separated from each other and corresponding to a respective plurality of frequency band signals of the IF wideband signal.

8. The system of claim 7 wherein,
the processor is a Fast Fourier Transform processor for computing N point Fast Fourier transforms of the N filter complex signals once every clock cycle of $(f_s/N)^{-1}$ seconds, and
the polyphase filter bank comprises a plurality of digital filters each of which is a finite impulse response filter.

9. The system of claim 7 wherein, the IF wideband signal comprises a plurality of channel signals that are in frequency division multiple access signals having a channel bandwidth, and
the polyphase filter bank comprises a plurality of digital filters each of which having a bandwidth equal to ½ of a bandwidth of a respective channel signal in the input signal.

* * * * *